(12) United States Patent
Liu et al.

(10) Patent No.: US 10,945,257 B2
(45) Date of Patent: Mar. 9, 2021

(54) DATA SENDING METHOD, TERMINAL DEVICE, AND ACCESS NETWORK DEVICE

(71) Applicant: Huawei Technologies Co., Ltd., Shenzhen (CN)

(72) Inventors: Deping Liu, Beijing (CN); Zhenshan Zhao, Shenzhen (CN); Hong Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/453,523

(22) Filed: Jun. 26, 2019

(65) Prior Publication Data

US 2019/0320423 A1 Oct. 17, 2019

Related U.S. Application Data

(63) Continuation of application No. PCT/CN2016/112435, filed on Dec. 27, 2016.

(51) Int. Cl.
*H04W 4/00* (2018.01)
*H04W 72/04* (2009.01)
(Continued)

(52) U.S. Cl.
CPC ......... *H04W 72/042* (2013.01); *H04W 72/02* (2013.01); *H04W 72/00* (2013.01); *H04W 72/04* (2013.01)

(58) Field of Classification Search
CPC ... H04W 72/042; H04W 72/02; H04W 72/04; H04W 72/00
See application file for complete search history.

(56) References Cited

U.S. PATENT DOCUMENTS

| 2015/0003391 A1* | 1/2015 | Chen | H04L 5/0044 370/329 |
| 2016/0270012 A1* | 9/2016 | Chen | H04W 56/002 |

(Continued)

FOREIGN PATENT DOCUMENTS

| CN | 104053239 A | 9/2014 |
| CN | 105430751 A | 3/2016 |

(Continued)

OTHER PUBLICATIONS

"Pool design for V2V," 3GPP TSG RAN WG1 Meeting #86bis, Lisboa, Portugal, R1-1609726, pp. 1-3, 3rd Generation Partnership Project, Valbonne, France (Oct. 10-14, 2016).

(Continued)

*Primary Examiner* — Abdelnabi O Musa
(74) *Attorney, Agent, or Firm* — Leydig, Voit & Mayer, Ltd.

(57) ABSTRACT

A data sending method, a terminal device, an access network device, and a system are provided. The method includes: obtaining, by a terminal device, a sending period of first data; obtaining, by the terminal device, configuration information of a first resource; determining, a second resource based on the configuration information of the first resource and a sending period of the first data; and selecting, by the terminal device, a resource other than the second resource to send the first data. When selecting a resource used for V2X communications data or D2D communications data, the terminal device excludes the second resource that cannot be used for the V2X communications data or the D2D communications data, so as to avoid a conflict between the second resource and the resource selected by the terminal device for sending the first data, and improve reliability and security of D2D communication and V2X communication.

12 Claims, 7 Drawing Sheets

(51) Int. Cl.
*H04W 72/02* (2009.01)
*H04W 72/00* (2009.01)

(56) References Cited

U.S. PATENT DOCUMENTS

2016/0295624 A1  10/2016  Novlan et al.
2017/0230959 A1*  8/2017  Wu ..................... H04W 72/048
2017/0359819 A1* 12/2017  Wang ................... H04L 5/0037

FOREIGN PATENT DOCUMENTS

| CN | 105451211 A | 3/2016 |
| CN | 105592523 A | 5/2016 |
| CN | 105991207 A | 10/2016 |
| JP | 2007281867 A | 10/2007 |
| WO | 2015178642 A1 | 11/2015 |
| WO | 2016186059 A1 | 11/2016 |

OTHER PUBLICATIONS

"Pool design for V2V," 3GPP TSG RAN WG1 Meeting #86, Göteborg, Sweden, R1-166974, pp. 1-3, 3rd Generation Partnership Project, Valbonne, France (Aug. 22-26, 2016).

"Sensing based resource selection for V2P," 3GPP TSG-RAN WG1 #87, Reno, Nevada, USA, R1-1611592, pp. 1-3, 3rd Generation Partnership Project, Valbonne, France (Nov. 14-18, 2016).

Orfanos et al., "A Centralized MAC Protocol with QoS Support for Wireless LANs," The 18th Annual IEEE International Symposium on Personal, Indoor and Mobile Radio Communications (PIMRC'07), pp. 1-5, Institute of Electrical and Electronics Engineers, New York, New York (2007).

"Discussion on sensing aspects to support V2V communication with different transmission periodicity," 3GPP TSG RAN WG1 Meeting #85, Nanjing, China, R1-165073, pp. 1-7, 3rd Generation Partnership Project, Valbonne, France (May 23-27, 2016).

* cited by examiner

DATA SENDING METHOD, TERMINAL DEVICE, AND ACCESS NETWORK DEVICE

CROSS-REFERENCE TO RELATED APPLICATIONS

This application is a continuation of International Application No. PCT/CN2016/112435, filed on Dec. 27, 2016, the disclosure of which is hereby incorporated by reference in its entirety.

TECHNICAL FIELD

Embodiments of this application relate to communications systems, and in particular, to a data sending method, a terminal device, and an access network device.

BACKGROUND

Device-to-device (D2D) communication, vehicle-to-vehicle (V2V) communication, vehicle-to-pedestrian V2P (V2P) communication, or vehicle-to-infrastructure/network V2I/N (V2I/N) communication is a technology for direct communication between terminal devices. V2V, V2P, and V2I/N are collectively referred to as V2X, namely, a vehicle communicates with anything.

V2X communication includes a mode 3 and a mode 4. In the mode 3, a terminal device communicates with another terminal device on a resource allocated by an access network device. In the mode 4, the terminal device independently selects a resource and communicates with the another terminal device on the selected resource. Usually, for the sake of security or simplicity, the terminal device reserves the selected resource for a period of time, and periodically sends data to the another terminal device, where the data includes, for example, speed information, location information, and/or status information of the vehicle. In an actual communications system, some resources cannot be used for performing V2X communication. If the terminal device selects these resources, V2X communication cannot be performed.

Therefore, a technical solution is urgently required in the industry to improve reliability and security of the D2D communication and the V2X communication.

SUMMARY

Embodiments of this application provide a data sending method, a terminal device, and an access network device, so as to improve reliability and security of D2D communication and V2X communication.

According to a first aspect, a data sending method is provided, and the method includes: obtaining, by a terminal device, a sending period of first data; obtaining, by the terminal device, configuration information of a first resource, where the first resource cannot be used for sending the first data; determining, by the terminal device, a second resource based on the configuration information of the first resource and the sending period of the first data; and selecting, by the terminal device, a resource other than the second resource to send the first data.

In a possible design, the second resource includes the first resource and a third resource, and the third resource is separated from the first resource by at least one sending period of the first data.

In a possible design, the first resource includes a synchronization subframe, and the configuration information of the first resource includes a period of the synchronization subframe and an offset; and the determining, by the terminal device, a second resource based on the configuration information of the first resource and the sending period of the first data includes: determining, by the terminal device, the second resource based on the period of the synchronization subframe, the offset, and the sending period of the first data.

In a possible design, the determining, by the terminal device, the second resource based on the period of the synchronization subframe, the offset, and the sending period of the first data includes: determining, by the terminal device, a greatest common divisor X of the period of the synchronization subframe and the sending period of the first data based on the period of the synchronization subframe and the sending period of the first data; and determining, by the terminal device, the second resource based on the offset and the greatest common divisor X, where a subframe number k of the second resource satisfies a formula: mod(abs(k−offset), X)=0, where k is an integer greater than or equal to 0, the offset is an offset of a first synchronization subframe in a system frame number cycle relative to a first subframe in the system frame number cycle, or the offset is an offset of a first synchronization subframe in a direct frame number cycle relative to a first subframe in the direct frame number cycle, X is a positive integer, abs(k−offset) represents an absolute value of k−offset, and mod(abs(k−offset), X) represents a remainder obtained by dividing abs(k−offset) by X.

In a possible design, the selecting, by the terminal device, a resource other than the second resource to send the first data includes: selecting, by the terminal device from resources in a data sending resource selection window except the second resource, the resource for sending the first data.

In a possible design, a length of the data sending resource selection window is less than or equal to a first value Y, and the first value Y satisfies the following inequality: the sending period of the first data≤Y≤100 milliseconds.

In a possible design, the obtaining, by the terminal device, configuration information of a first resource includes: receiving, by the terminal device, the configuration information of the first resource from an access network device; or obtaining, by the terminal device, the configuration information of the first resource based on preconfigured information.

In a possible design, the processing unit may be a processor, the sending unit may be a transmitter or a transceiver, and the receiving unit may be a receiver or a transceiver.

According to a second aspect, a terminal device is provided, and the terminal device includes a processing unit. The processing unit is configured to obtain a sending period of first data; the processing unit is further configured to obtain configuration information of a first resource, where the first resource cannot be used for sending the first data; the processing unit is further configured to determine a second resource based on the configuration information of the first resource and the sending period of the first data; and the processing unit is further configured to select a resource other than the second resource to send the first data.

In a possible design, the second resource includes the first resource and a third resource, and the third resource is separated from the first resource by at least one sending period of the first data.

In a possible design, the first resource includes a synchronization subframe, and the configuration information of the first resource includes a period of the synchronization subframe and an offset; and that the processing unit is further configured to determine a second resource based on the configuration information of the first resource and the sending period of the first data includes: the processing unit determines the second resource based on the period of the synchronization subframe, the offset, and the sending period of the first data.

In a possible design, that the processing unit determines the second resource based on the period of the synchronization subframe, the offset, and the sending period of the first data includes: the processing unit determines a greatest common divisor X of the period of the synchronization subframe and the sending period of the first data based on the period of the synchronization subframe and the sending period of the first data; and the processing unit determines the second resource based on the offset and the greatest common divisor X, where a subframe number k of the second resource satisfies a formula: mod(abs(k−offset), X)=0, where k is an integer greater than or equal to 0, the offset is an offset of a first synchronization subframe in a system frame number cycle relative to a first subframe in the system frame number cycle, or the offset is an offset of a first synchronization subframe in a direct frame number cycle relative to a first subframe in the direct frame number cycle, X is a positive integer, abs(k−offset) represents an absolute value of k−offset, and mod(abs(k−offset), X) represents a remainder obtained by dividing abs(k−offset) by X.

In a possible design, that the processing unit is further configured to select a resource other than the second resource to send the first data includes: the processing unit selects, from resources in a data sending resource selection window except the second resource, the resource for sending the first data.

In a possible design, a length of the data sending resource selection window is less than or equal to a first value Y, and the first value Y satisfies the following inequality: the sending period of the first data≤Y≤100 milliseconds.

In a possible design, that the processing unit is configured to obtain configuration information of a first resource includes: the processing unit obtains the configuration information of the first resource based on preconfigured information; or the terminal device further includes a receiving unit, and the receiving unit receives the configuration information of the first resource from an access network device.

In a possible design, the processing unit may be a processor, and the receiving unit may be a receiver or a transceiver.

According to a third aspect, a data sending method is provided, and the method includes: sending, by an access network device, configuration information of a first resource to a terminal device, where the first resource cannot be used for sending first data, the configuration information of the first resource is used by the terminal device to determine a second resource based on the configuration information of the first resource and a sending period of the first data, and the second resource is used by the terminal device to select a resource other than the second resource to send the first data.

In a possible design, the second resource includes the first resource and a third resource, and the third resource is separated from the first resource by at least one sending period of the first data.

In a possible design, the first resource includes a synchronization subframe, and the configuration information of the first resource includes a period of the synchronization subframe and an offset; and the determining, by the terminal device, a second resource based on the configuration information of the first resource and a sending period of the first data includes: determining, by the terminal device, the second resource based on the period of the synchronization subframe, the offset, and the sending period of the first data.

In a possible design, the determining, by the terminal device, the second resource based on the period of the synchronization subframe, the offset, and the sending period of the first data includes: determining, by the terminal device, a greatest common divisor X of the period of the synchronization subframe and the sending period of the first data based on the period of the synchronization subframe and the sending period of the first data; and determining, by the terminal device, the second resource based on the offset and the greatest common divisor X, where a subframe number k of the second resource satisfies a formula: mod(abs(k−offset), X)=0, where k is an integer greater than or equal to 0, the offset is an offset of a first synchronization subframe in a system frame number cycle relative to a first subframe in the system frame number cycle, or the offset is an offset of a first synchronization subframe in a direct frame number cycle relative to a first subframe in the direct frame number cycle, X is a positive integer, abs(k−offset) represents an absolute value of k−offset, and mod(abs(k−offset), X) represents a remainder obtained by dividing abs(k−offset) by X.

In a possible design, the selecting, by the terminal device, a resource other than the second resource to send the first data includes: selecting, by the terminal device from resources in a data sending resource selection window except the second resource, the resource for sending the first data.

In a possible design, a length of the data sending resource selection window is less than or equal to a first value Y, and the first value Y satisfies the following inequality: the sending period of the first data≤Y≤100 milliseconds.

In a possible design, the obtaining, by the terminal device, configuration information of a first resource includes: receiving, by the terminal device, the configuration information of the first resource from an access network device; or obtaining, by the terminal device, the configuration information of the first resource based on preconfigured information.

According to a fourth aspect, an access network device is provided, and the access network device includes a sending unit. The sending unit is configured to send configuration information of a first resource to a terminal device, where the first resource cannot be used for sending first data, the configuration information of the first resource is used by the terminal device to determine a second resource based on the configuration information of the first resource and a sending period of the first data, and the second resource is used by the terminal device to select a resource other than the second resource to send the first data.

In a possible design, the second resource includes the first resource and a third resource, and the third resource is separated from the first resource by at least one sending period of the first data.

In a possible design, the first resource includes a synchronization subframe, and the configuration information of the first resource includes a period of the synchronization subframe and an offset; and that the terminal device determines a second resource based on the configuration information of the first resource and a sending period of the first data includes: the terminal device determines the second resource based on the period of the synchronization subframe, the offset, and the sending period of the first data.

In a possible design, that the terminal device determines the second resource based on the period of the synchronization subframe, the offset, and the sending period of the first data includes: the terminal device determines a greatest common divisor X of the period of the synchronization subframe and the sending period of the first data based on the period of the synchronization subframe and the sending period of the first data; and the terminal device determines the second resource based on the offset and the greatest common divisor X, where a subframe number k of the second resource satisfies a formula: mod(abs(k−offset), X)=0, where k is an integer greater than or equal to 0, the offset is an offset of a first synchronization subframe in a system frame number cycle relative to a first subframe in the system frame number cycle, or the offset is an offset of a first synchronization subframe in a direct frame number cycle relative to a first subframe in the direct frame number cycle, X is a positive integer, abs(k−offset) represents an absolute value of k−offset, and mod(abs(k−offset), X) represents a remainder obtained by dividing abs(k−offset) by X.

In a possible design, that the terminal device selects a resource other than the second resource to send the first data includes: the terminal device selects, from resources in a data sending resource selection window except the second resource, the resource for sending the first data.

In a possible design, a length of the data sending resource selection window is less than or equal to a first value Y, and the first value Y satisfies the following inequality: the sending period of the first data≤Y≤100 milliseconds.

In a possible design, the processing unit may be a processor, and the sending unit may be a transmitter or a transceiver.

According to a fifth aspect, a data sending system is provided, where the system includes a terminal device and an access network device. The terminal device obtains a sending period of first data; the access network device sends configuration information of a first resource to the terminal device, where the first resource cannot be used for sending the first data; the terminal device determines a second resource based on the configuration information of the first resource and the sending period of the first data; and the terminal device selects a resource other than the second resource to send the first data.

In a possible design, the second resource includes the first resource and a third resource, and the third resource is separated from the first resource by at least one sending period of the first data.

In a possible design, the first resource includes a synchronization subframe, and the configuration information of the first resource includes a period of the synchronization subframe and an offset; and that the terminal device determines a second resource based on the configuration information of the first resource and the sending period of the first data includes: the terminal device determines the second resource based on the period of the synchronization subframe, the offset, and the sending period of the first data.

In a possible design, that the terminal device determines the second resource based on the period of the synchronization subframe, the offset, and the sending period of the first data includes: the terminal device determines a greatest common divisor X of the period of the synchronization subframe and the sending period of the first data based on the period of the synchronization subframe and the sending period of the first data; and the terminal device determines the second resource based on the offset and the greatest common divisor X, where a subframe number k of the second resource satisfies a formula: mod(abs(k−offset), X)=0, where k is an integer greater than or equal to 0, the offset is an offset of a first synchronization subframe in a system frame number cycle relative to a first subframe in the system frame number cycle, or the offset is an offset of a first synchronization subframe in a direct frame number cycle relative to a first subframe in the direct frame number cycle, X is a positive integer, abs(k−offset) represents an absolute value of k−offset, and mod(abs(k−offset), X) represents a remainder obtained by dividing abs(k−offset) by X.

In a possible design, that the terminal device selects a resource other than the second resource to send the first data includes: the terminal device selects, from resources in a data sending resource selection window except the second resource, the resource for sending the first data.

In a possible design, a length of the data sending resource selection window is less than or equal to a first value Y, and the first value Y satisfies the following inequality: the sending period of the first data≤Y≤100 milliseconds.

In a possible design, that the terminal device obtains configuration information of a first resource includes: the terminal device receives the configuration information of the first resource from the access network device; or the terminal device obtains the configuration information of the first resource based on preconfigured information.

According to a sixth aspect, an embodiment of this application provides a computer storage medium, configured to store a computer software instruction used by the foregoing base station, and the computer software instruction includes a program designed to perform the foregoing aspect.

According to a seventh aspect, an embodiment of this application provides a computer storage medium, configured to store a computer software instruction used by the foregoing terminal device, and the computer software instruction includes a program designed to perform the foregoing aspect.

According to the foregoing solutions, the first resource is a resource that cannot be used for transmitting V2X communications data or D2D communications data, and the terminal device determines the second resource based on the configuration information of the first resource and the sending period of the first data; and the second resource is also a resource that cannot be used for transmitting V2X communications data or D2D communications data, and the terminal device selects the resource other than the second resource to send the first data. Therefore, when selecting the resource used for the V2X communications data or the D2D communications data, the terminal device excludes the second resource that cannot be used for the V2X communications data or the D2D communications data, so as to avoid a conflict between the second resource and the resource selected by the terminal device for sending the first data, and improve reliability and security of D2D communication and V2X communication.

DESCRIPTION OF EMBODIMENTS

Figure 1:
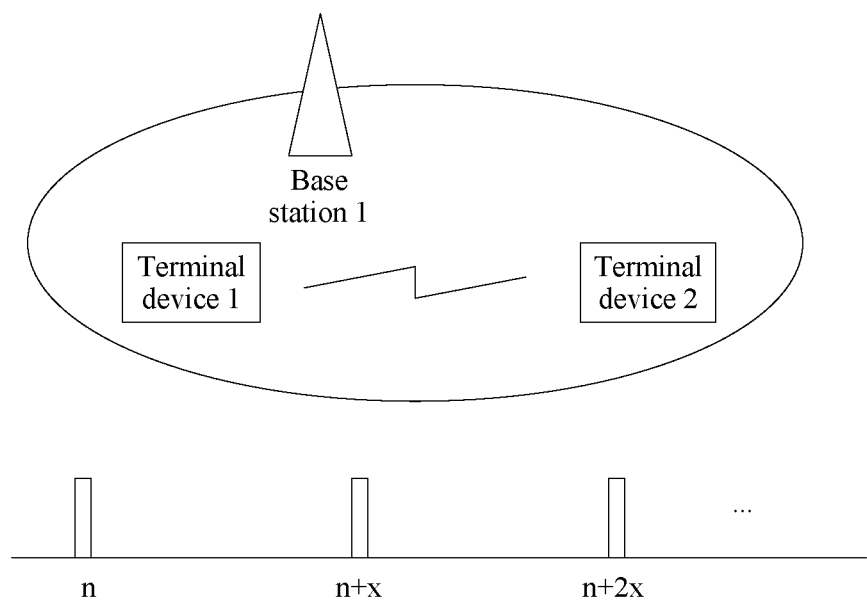
FIG. 1 is a schematic architectural diagram of a system according to an embodiment of this application.

As shown in FIG. 1, in a mode 4, a terminal device 1 selects a resource for sending data to a terminal device 2, reserves the resource for a period of time, and sends the data to the terminal device 2 in a period of z. A time length for reserving the resource may be received from an access network device, may be preset, or may be independently selected by the terminal device 1. The terminal device 1 sends the data to the terminal device 2 at moments n, n+z, n+2z, . . . , and n+rz on the selected resource, where n is a moment at which the terminal device 1 sends the data to the terminal device 2 for the first time, and r is 0, 1, 2, 3, or the like.

The access network device in this application is an apparatus that is deployed in a radio access network to provide a wireless communication function for the terminal device. The access network device may include base stations (BS) in various forms, for example, a macro base station, a micro base station, a relay node, and an access point. In systems using different radio access technologies, a device having a function of the access network device may have different names. For example, in an LTE network, the device is referred to as an evolved NodeB (eNB or eNodeB); and in a 3rd generation 3G network, the device is referred to as a NodeB or the like, or a roadside unit (RSU) in V2V communication. For ease of description, in this application, the foregoing apparatuses that provide the wireless communication function for the terminal device are collectively referred to as access network devices.

The terminal device in this application may include various handheld devices having the wireless communication function, for example, an in-vehicle device, a wearable device, a computing device, another processing device connected to a wireless modem, a mobile station (MS), a terminal, and user equipment (UE). For ease of description, in this application, the foregoing devices are collectively referred to as terminal devices.

The following describes embodiments of this application in more detail with reference to specific examples.

Figure 2:
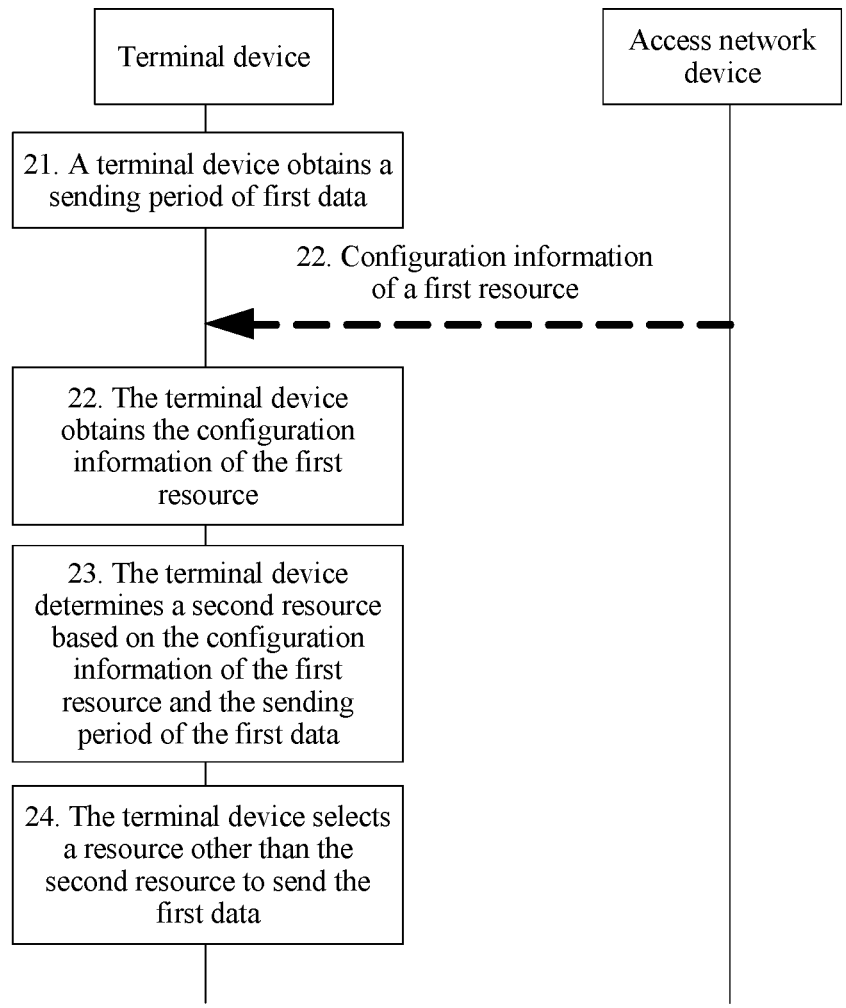
FIG. 2 shows a data sending method and system according to an embodiment of this application.

FIG. 2 shows a data sending method and system according to an embodiment of this application. Specific steps are as follows.

Step 21: A terminal device obtains a sending period of first data.

In an optional embodiment, the first data includes at least one piece of information of the terminal device: speed information, location information, or status information. The terminal device periodically sends the first data based on the sending period of the first data, where the sending period may be P milliseconds or P subframes, and P is a positive integer. Optionally, a higher speed of the terminal device indicates a shorter sending period of the first data. Optionally, the first data includes V2X communications data or D2D communications data.

Step 22: The terminal device obtains configuration information of a first resource, where the first resource cannot be used for sending the first data.

In an optional embodiment, the first resource is a synchronization subframe or a reserved subframe. The configuration information of the first resource includes a period of the synchronization subframe or the reserved subframe and an offset. The synchronization subframe is a subframe used to send or receive a synchronization signal; the reserved subframe is a subframe that cannot be used for V2X communication; and the offset is an offset of a first synchronization subframe in a system frame number (SFN) cycle relative to a first subframe in the system frame number cycle, or the offset is an offset of a first synchronization subframe in a direct frame number (DFN) cycle relative to a first subframe in the direct frame number cycle. Optionally, in the embodiment shown in FIG. 2, the first resource may be a synchronization subframe, or may be a reserved subframe. However, in the embodiment in FIG. 2, that the first resource is a synchronization subframe is used as an example for detailed description. In the embodiment in FIG. 2, all synchronization subframes may be replaced with reserved subframes.

In an optional embodiment, that the terminal device obtains configuration information of a first resource includes: the terminal device receives the configuration information of the first resource from an access network device, and the access network device sends the configuration information of the first resource to the terminal device; or the terminal device obtains the configuration information of the first resource based on preconfigured information.

Optionally, a sequence of performing step 21 and step 22 is not limited.

Step 23: The terminal device determines a second resource based on the configuration information of the first resource and the sending period of the first data.

In an optional embodiment, the second resource is a resource that is determined based on the configuration information of the first resource and the sending period of the first data and that cannot be used for sending the first data, the second resource includes the first resource and a third resource, and the third resource is separated from the first resource by at least one sending period of the first data. Optionally, the first resource and the third resource are different resources, and the third resource coincides with the first resource after at least one sending period of the first data.

In an optional embodiment, that the terminal device determines a second resource based on the configuration information of the first resource and the sending period of the first data includes: the terminal device determines the second resource based on the period of the synchronization subframe, the offset, and the sending period of the first data.

In an optional embodiment, that the terminal device determines the second resource based on the period of the synchronization subframe, the offset, and the sending period of the first data includes: the terminal device determines a greatest common divisor X of the period of the synchronization subframe and the sending period of the first data based on the period of the synchronization subframe and the sending period of the first data; and the terminal device determines the second resource based on the offset and the greatest common divisor X, where a subframe number k of the second resource satisfies a formula: $\mod(\abs(k-\text{offset}), X)=0$, where k is an integer greater than or equal to 0, the offset is the offset of the first synchronization subframe in the system frame number (SFN) cycle relative to the first subframe in the system frame number cycle, or the offset is the offset of the first synchronization subframe in the direct frame number (DFN) cycle relative to the first subframe in the direct frame number cycle, X is a positive integer, abs(k−offset) represents an absolute value of k−offset, namely, |k−offset|, and mod(abs(k−offset), X) represents a remainder obtained by dividing abs(k−offset) by X. One system frame includes 10 subframes, and one system frame number cycle (SFN cycle) includes 1024 system frames. 10240 subframes of the 1024 system frames are consecutively numbered from 0 to 10239, a first subframe is a subframe 0, and a 10240$^{th}$ subframe is a subframe 10239. Subframes following the subframe 10239 are subframes in a next cycle, and a first subframe in the system frame number cycle is the subframe 0. One direct frame includes 10 subframes, and one direct frame number cycle (DFN cycle) includes 1024 direct frames. 10240 subframes of the 1024 direct frames are consecutively numbered from 0 to 10239, a first subframe is a subframe 0, and a 10240th subframe is a subframe 10239. Subframes following the subframe 10239 are subframes in a next cycle, and a first subframe in the direct frame number cycle is the subframe 0.

In an optional embodiment, the synchronization subframe periodically appears, where the offset is a quantity of subframes that are offset by the first synchronization subframe in the system frame number cycle relative to the first subframe (the subframe 0) in the system frame number cycle, or the offset is a quantity of subframes that are offset by the first synchronization subframe in the direct frame number cycle relative to the first subframe (the subframe 0) in the direct frame number cycle. For example, if the synchronization subframe in the system frame number cycle first appears in a fifth subframe, the offset is 5 subframes, and then synchronization subframes in the system frame number cycle continually appear based on the period of the synchronization subframe.

Step 24: The terminal device selects a resource other than the second resource to send the first data.

In an optional embodiment, that the terminal device selects a resource other than the second resource to send the first data includes: the terminal device selects, from resources in a data sending resource selection window except the second resource, the resource for sending the first data.

In an optional embodiment, a length of the data sending resource selection window is less than or equal to a first value Y, and the first value Y satisfies the following inequality: the sending period of the first data≤Y≤100 milliseconds.

According to this embodiment of this application, the first resource is a resource that cannot be used for transmitting the V2X communications data or the D2D communications data, and the terminal device determines the second resource based on the configuration information of the first resource and the sending period of the first data; and the second resource is also a resource that cannot be used for transmitting the V2X communications data or the D2D communications data, and the terminal device selects the resource other than the second resource to send the first data. Therefore, when selecting the resource used for the V2X communications data or the D2D communications data, the terminal device excludes the second resource that cannot be used for the V2X communications data or the D2D communications data, so as to avoid a conflict between the second resource and the resource selected by the terminal device for sending the first data, and improve reliability and security of D2D communication and V2X communication.

Figure 3:
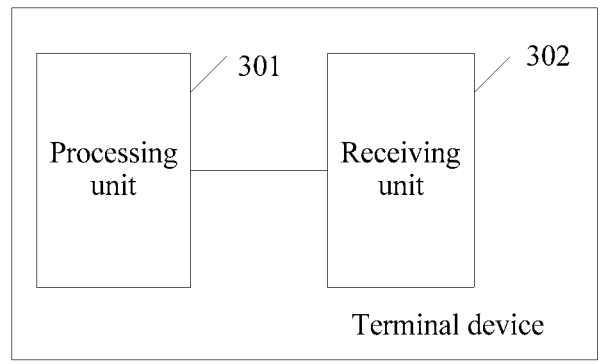
FIG. 3 shows a terminal device according to an embodiment of this application.

FIG. 3 is a possible schematic structural diagram of a terminal device configured to perform the method in the embodiment in FIG. 2. The terminal device includes a processing unit 301.

The processing unit 301 is configured to obtain a sending period of first data.

In an optional embodiment, the first data includes at least one piece of information of the terminal device: speed information, location information, and status information. The terminal device periodically sends the first data based on the sending period of the first data, where the sending period may be P milliseconds or P subframes, and P is a positive integer. Optionally, a higher speed of the terminal device indicates a shorter sending period of the first data. Optionally, the first data includes V2X communications data or D2D communications data.

The processing unit 301 is further configured to obtain configuration information of a first resource, where the first resource cannot be used for sending the first data.

In an optional embodiment, the first resource is a synchronization subframe or a reserved subframe. The configuration information of the first resource includes a period of the synchronization subframe or the reserved subframe and an offset. The synchronization subframe is a subframe used to send or receive a synchronization signal; the reserved subframe is a subframe that cannot be used for V2X communication; and the offset is an offset of a first synchronization subframe in a system frame number (SFN) cycle relative to a first subframe in the system frame number cycle, or the offset is an offset of a first synchronization subframe in a direct frame number (DFN) cycle relative to a first subframe in the direct frame number cycle. Optionally, in the embodiment shown in FIG. 3, the first resource may be a synchronization subframe, or may be a reserved subframe. However, in the embodiment in FIG. 3, that the first resource is a synchronization subframe is used as an example for detailed description. In the embodiment in FIG. 3, all synchronization subframes may be replaced with reserved subframes.

In an optional embodiment, that the processing unit 301 obtains configuration information of a first resource includes: the terminal device obtains the configuration information of the first resource based on preconfigured information. Optionally, the terminal device further includes a receiving unit 302. Obtaining the configuration information of the first resource by the processing unit 301 may be replaced with receiving the configuration information of the first resource by the receiving unit 302 from an access network device. In other words, the receiving unit 302 receives the configuration information of the first resource from the access network device, and the access network device sends the configuration information of the first resource to the receiving unit 302.

The processing unit 301 is further configured to determine a second resource based on the configuration information of the first resource and the sending period of the first data.

In an optional embodiment, the second resource is a resource that is determined based on the configuration information of the first resource and the sending period of the first data and that cannot be used for sending the first data, the second resource includes the first resource and a third resource, and the third resource is separated from the first resource by at least one sending period of the first data. Optionally, the first resource and the third resource are different resources, and the third resource coincides with the first resource after at least one sending period of the first data.

In an optional embodiment, that the processing unit 301 determines a second resource based on the configuration information of the first resource and the sending period of the first data includes: the processing unit 301 determines the second resource based on the period of the synchronization subframe, the offset, and the sending period of the first data.

In an optional embodiment, that the processing unit 301 determines the second resource based on the period of the synchronization subframe, the offset, and the sending period of the first data includes: the processing unit 301 determines a greatest common divisor X of the period of the synchronization subframe and the sending period of the first data based on the period of the synchronization subframe and the sending period of the first data; and the processing unit 301 determines the second resource based on the offset and the greatest common divisor X, where a subframe number k of the second resource satisfies a formula: mod(abs(k−offset), X)=0, where k is an integer greater than or equal to 0, the offset is the offset of the first synchronization subframe in the system frame number (SFN) cycle relative to the first subframe in the system frame number cycle, or the offset is the offset of the first synchronization subframe in the direct frame number (DFN) cycle relative to the first subframe in the direct frame number cycle, X is a positive integer, abs(k−offset) represents an absolute value of k−offset, namely, |k−offset|, and mod(abs(k−offset), X) represents a remainder obtained by dividing abs(k−offset) by X. One system frame includes 10 subframes, and one system frame number cycle (SFN cycle) includes 1024 system frames. 10240 subframes of the 1024 system frames are consecutively numbered from 0 to 10239, a first subframe is a subframe 0, and a 10240$^{th}$ subframe is a subframe 10239. Subframes following the subframe 10239 are subframes in a next cycle, and a first subframe in the system frame number cycle is the subframe 0. One direct frame includes 10 subframes, and one direct frame number cycle (DFN cycle) includes 1024 direct frames. 10240 subframes of the 1024 direct frames are consecutively numbered from 0 to 10239, a first subframe is a subframe 0, and a 10240th subframe is a subframe 10239. Subframes following the subframe 10239 are subframes in a next cycle, and a first subframe in the direct frame number cycle is the subframe 0.

In an optional embodiment, the synchronization subframe periodically appears, where the offset is a quantity of subframes that are offset by the first synchronization subframe in the system frame number cycle relative to the first subframe (the subframe 0) in the system frame number cycle, or the offset is a quantity of subframes that are offset by the first synchronization subframe in the direct frame number cycle relative to the first subframe (the subframe 0) in the direct frame number cycle. For example, if the synchronization subframe in the system frame number cycle first appears in a fifth subframe, the offset is 5 subframes, and then synchronization subframes in the system frame number cycle continually appear based on the period of the synchronization subframe.

The processing unit 301 is further configured to select a resource other than the second resource to send the first data.

In an optional embodiment, that the processing unit 301 selects a resource other than the second resource to send the first data includes: the processing unit 301 selects, from resources in a data sending resource selection window except the second resource, the resource for sending the first data.

In an optional embodiment, a length of the data sending resource selection window is less than or equal to a first value Y, and the first value Y satisfies the following inequality: the sending period of the first data≤Y≤100 milliseconds.

Figure 4:
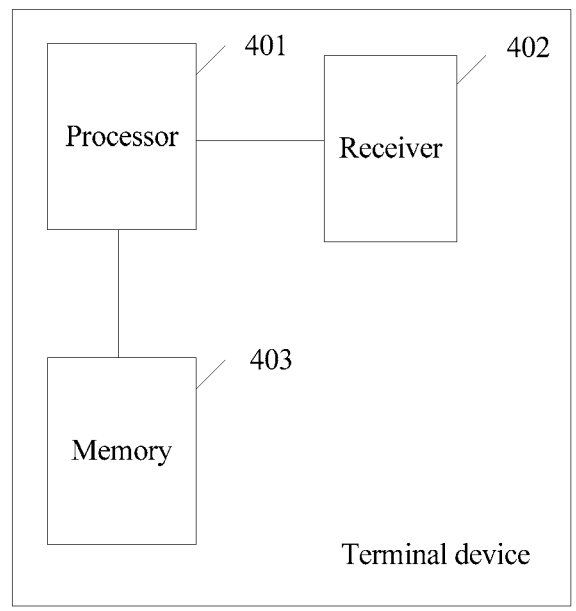
FIG. 4 shows another terminal device according to an embodiment of this application.

In an optional embodiment, the processing unit 301 may be a processor 401, the receiving unit 302 may be a receiver 402, and the receiver 402 may be replaced with a transceiver. In addition, the terminal device may further include a memory 403, where the memory 403 is configured to store program code and data of the terminal device. Specifically, as shown in FIG. 4, the terminal device includes the processor 401, and the terminal device may further include the receiver 402.

According to this embodiment of this application, the first resource is a resource that cannot be used for transmitting the V2X communications data or the D2D communications data, and the terminal device determines the second resource based on the configuration information of the first resource and the sending period of the first data; and the second resource is also a resource that cannot be used for transmitting the V2X communications data or the D2D communications data, and the terminal device selects the resource other than the second resource to send the first data. Therefore, when selecting the resource used for the V2X communications data or the D2D communications data, the terminal device excludes the second resource that cannot be used for the V2X communications data or the D2D communications data, so as to avoid a conflict between the second resource and the resource selected by the terminal device for sending the first data, and improve reliability and security of D2D communication and V2X communication.

Figure 5:
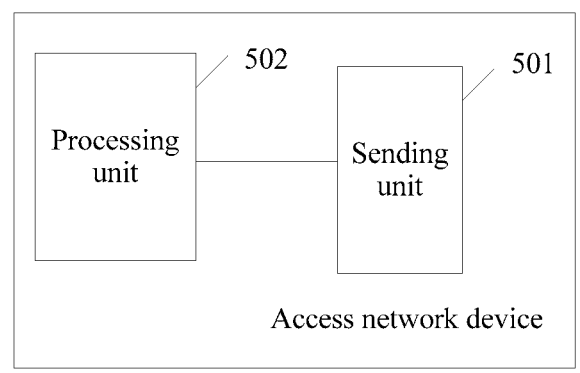
FIG. 5 shows an access network device according to an embodiment of this application.

FIG. 5 is a possible schematic structural diagram of an access network device configured to perform the method in the embodiment in FIG. 2. The access network device includes a sending unit 501. Optionally, the access network device further includes a processing unit 502.

The sending unit 501 is configured to send configuration information of a first resource to a terminal device, where the first resource cannot be used for sending first data, the configuration information of the first resource is used by the terminal device to determine a second resource based on the configuration information of the first resource and a sending period of the first data, and the second resource is used by the terminal device to select a resource other than the second resource to send the first data.

In an optional embodiment, the first data includes at least one piece of information of the terminal device: speed information, location information, and status information. The terminal device periodically sends the first data based on the sending period of the first data, where the sending period may be P milliseconds or P subframes, and P is a positive integer. Optionally, a higher speed of the terminal device indicates a shorter sending period of the first data. Optionally, the first data includes V2X communications data or D2D communications data.

In an optional embodiment, the second resource is a resource that is determined based on the configuration information of the first resource and the sending period of the first data and that cannot be used for sending the first data, the second resource includes the first resource and a third resource, and the third resource is separated from the first resource by at least one sending period of the first data. Optionally, the first resource and the third resource are different resources, and the third resource coincides with the first resource after at least one sending period of the first data.

In an optional embodiment, the first resource is a synchronization subframe or a reserved subframe. The configuration information of the first resource includes a period of the synchronization subframe or the reserved subframe and an offset. The synchronization subframe is a subframe used to send or receive a synchronization signal; the reserved subframe is a subframe that cannot be used for V2X communication; and the offset is an offset of a first synchronization subframe in a system frame number (SFN) cycle relative to a first subframe in the system frame number cycle, or the offset is an offset of a first synchronization subframe in a direct frame number (DFN) cycle relative to a first subframe in the direct frame number cycle. Optionally, in the embodiment shown in FIG. 5, the first resource may be a synchronization subframe, or may be a reserved subframe. However, in the embodiment in FIG. 5, that the first resource is a synchronization subframe is used as an example for detailed description. In the embodiment in FIG. 5, all synchronization subframes may be replaced with reserved subframes.

In an optional embodiment, the first resource includes a synchronization subframe, and the configuration information of the first resource includes the period of the synchronization subframe and the offset; and that the terminal device determines a second resource based on the configuration information of the first resource and a sending period of the first data includes: the terminal device determines the second resource based on the period of the synchronization subframe, the offset, and the sending period of the first data.

In an optional embodiment, that the terminal device determines the second resource based on the period of the synchronization subframe, the offset, and the sending period of the first data includes: the terminal device determines a greatest common divisor X of the period of the synchronization subframe and the sending period of the first data based on the period of the synchronization subframe and the sending period of the first data; and the terminal device determines the second resource based on the offset and the greatest common divisor X, where a subframe number k of the second resource satisfies a formula: mod(abs(k−offset), X)=0, where k is an integer greater than or equal to 0, the offset is the offset of the first synchronization subframe in the system frame number (SFN) cycle relative to the first subframe in the system frame number cycle, or the offset is the offset of the first synchronization subframe in the direct frame number (DFN) cycle relative to the first subframe in the direct frame number cycle, X is a positive integer, abs(k−offset) represents an absolute value of k−offset, namely, |k−offset|, and mod(abs(k−offset), X) represents a remainder obtained by dividing abs(k−offset) by X. One system frame includes 10 subframes, and one system frame number cycle (SFN cycle) includes 1024 system frames. 10240 subframes of the 1024 system frames are consecutively numbered from 0 to 10239, a first subframe is a subframe 0, and a 10240$^{th}$ subframe is a subframe 10239. Subframes following the subframe 10239 are subframes in a next cycle, and a first subframe in the system frame number cycle is the subframe 0. One direct frame includes 10 subframes, and one direct frame number cycle (DFN cycle) includes 1024 direct frames. 10240 subframes of the 1024 direct frames are consecutively numbered from 0 to 10239, a first subframe is a subframe 0, and a 10240th subframe is a subframe 10239. Subframes following the subframe 10239 are subframes in a next cycle, and a first subframe in the direct frame number cycle is the subframe 0.

In an optional embodiment, the synchronization subframe periodically appears, where the offset is a quantity of subframes that are offset by the first synchronization subframe in the system frame number cycle relative to the first subframe (the subframe 0) in the system frame number cycle, or the offset is a quantity of subframes that are offset by the first synchronization subframe in the direct frame number cycle relative to the first subframe (the subframe 0) in the direct frame number cycle. For example, if the synchronization subframe in the system frame number cycle first appears in a fifth subframe, the offset is 5 subframes, and then synchronization subframes in the system frame number cycle continually appear based on the period of the synchronization subframe.

In an optional embodiment, that the terminal device selects a resource other than the second resource to send the first data includes: the terminal device selects, from resources in a data sending resource selection window except the second resource, the resource for sending the first data.

In an optional embodiment, a length of the data sending resource selection window is less than or equal to a first value Y, and the first value Y satisfies the following inequality: the sending period of the first data$\leq Y \leq 100$ milliseconds.

Figure 6:
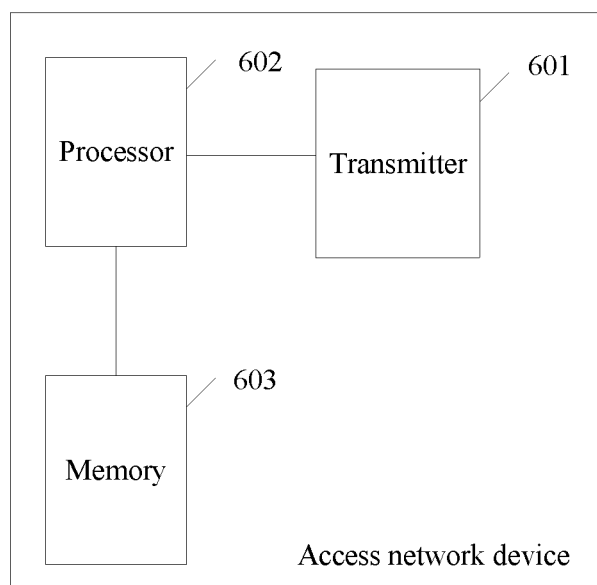
FIG. 6 shows another access network device according to an embodiment of this application.

In an optional embodiment, the sending unit 501 may be a transmitter 601, and the transmitter 601 may be replaced with a transceiver. In addition, the access network device may further include a processor 602 and a memory 603, where the memory 603 is configured to store program code and data of the access network device. Specifically, as shown in FIG. 6, the access network device includes the transmitter 601, the processor 602, and the memory 603.

According to this embodiment of this application, the first resource is a resource that cannot be used for transmitting the V2X communications data or the D2D communications data, and the terminal device determines the second resource based on the configuration information of the first resource and the sending period of the first data; and the second resource is also a resource that cannot be used for transmitting the V2X communications data or the D2D communications data, and the terminal device selects the resource other than the second resource to send the first data. Therefore, when selecting the resource used for the V2X communications data or the D2D communications data, the terminal device excludes the second resource that cannot be used for the V2X communications data or the D2D communications data, so as to avoid a conflict between the second resource and the resource selected by the terminal device for sending the first data, and improve reliability and security of D2D communication and V2X communication.

Figure 7:
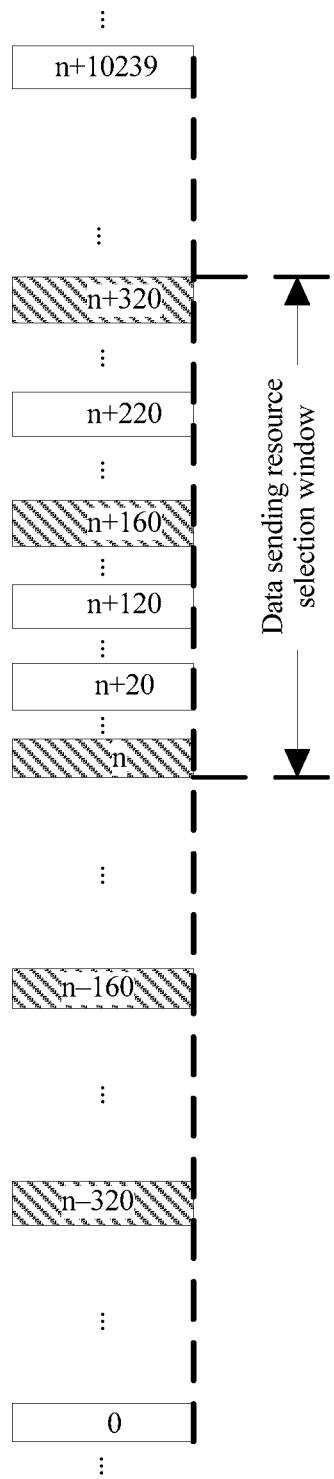
FIG. 7 shows a data sending method and system according to an embodiment of this application.

The following specifically describes the method in the embodiment in FIG. 2 by using FIG. 7 as an example.

Step 71: A terminal device obtains a sending period of first data.

In an optional embodiment, the first data includes at least one piece of information of the terminal device: speed information, location information, and status information. The terminal device periodically sends the first data based on the sending period of the first data. For example, the sending period of the first data is 100 ms, and because one subframe occupies 1 ms in time domain, the sending period of the first data may be converted into 100 subframes. Optionally, a higher speed of the terminal device indicates a shorter sending period of the first data. Optionally, the first data includes V2X communications data or D2D communications data.

Step 72: The terminal device obtains configuration information of a first resource, where the first resource cannot be used for sending the first data.

In an optional embodiment, the first resource is a synchronization subframe or a reserved subframe. In the embodiment in FIG. 7, that the first resource is a synchronization subframe is used as an example for description. The configuration information of the first resource includes a period of the synchronization subframe and an offset. The synchronization subframe is a subframe used to send or receive a synchronization signal; the reserved subframe is a subframe that cannot be used for V2X communication; and the offset is an offset of the synchronization subframe relative to a subframe 0. For example, as shown in FIG. 7, an offset is 0, and a period of a synchronization subframe is 160 ms, namely, 160 subframes. To be specific, synchronization subframes start from a subframe 0, and appear every 160 subframes. In the example of FIG. 7, the synchronization subframes include at least n−320, n−160, n, n+160, n+320, and the like. These synchronization subframes cannot be used for V2X communication or D2D communication. Optionally, in the embodiment shown in FIG. 7, the first resource may be a synchronization subframe, or may be a reserved subframe. However, in the embodiment in FIG. 7, that the first resource is a synchronization subframe is used as an example for detailed description. In the embodiment in FIG. 7, all synchronization subframes may be replaced with reserved subframes.

In an optional embodiment, there are at least two manners in which the terminal device obtains the configuration information of the first resource: In a first manner, the terminal device receives the configuration information of the first resource from an access network device, and the access network device sends the configuration information of the first resource to the terminal device. In a second manner, the terminal device obtains the configuration information of the first resource based on preconfigured information.

Optionally, a sequence of performing step 71 and step 72 is not limited.

Step 73: The terminal device determines a second resource based on the configuration information of the first resource and the sending period of the first data.

In an optional embodiment, the second resource is a resource that is determined based on the configuration information of the first resource and the sending period of the first data and that cannot be used for sending the first data, the second resource includes the first resource and a third resource, and the third resource is separated from the first resource by at least one sending period of the first data. Optionally, the first resource and the third resource are different resources, and the third resource coincides with the first resource after at least one sending period of the first data.

In an optional embodiment, that the terminal device determines a second resource based on the configuration information of the first resource and the sending period of the first data includes: the terminal device determines the second resource based on the period of the synchronization subframe, the offset, and the sending period of the first data.

In an optional embodiment, that the terminal device determines the second resource based on the period of the synchronization subframe, the offset, and the sending period of the first data includes two steps.

First step: The terminal device determines a greatest common divisor X of the period of the synchronization subframe and the sending period of the first data based on the period of the synchronization subframe and the sending period of the first data. As shown in FIG. 7, the period of the synchronization subframe is 160 ms, and the sending period of the first data is 100 ms, and therefore, a greatest common divisor of the period of the synchronization subframe and the sending period of the first data is 20 ms, namely, 20 subframes.

Second step: The terminal device determines the second resource based on the offset and the greatest common divisor X, where a subframe number k of the second resource satisfies a formula: mod(abs(k−offset), X)=0, where k is an integer greater than or equal to 0, the offset is an offset of a first synchronization subframe in a system frame number (SFN) cycle relative to a first subframe in the system frame number cycle, or the offset is an offset of a first synchronization subframe in a direct frame number (DFN) cycle relative to a first subframe in the direct frame number cycle, X is a positive integer, abs(k−offset) represents an absolute value of k−offset, namely, |k−offset|, and mod(abs(k−offset), X) represents a remainder obtained by dividing abs(k−offset) by X. One system frame includes 10 subframes, and one system frame number cycle (SFN cycle) includes 1024 system frames. 10240 subframes of the 1024 system frames are consecutively numbered from 0 to 10239, a first subframe is a subframe 0, and a 10240th subframe is a subframe 10239. Subframes following the subframe 10239 are subframes in a next cycle, and a first subframe in the system frame number cycle is the subframe 0. One direct frame includes 10 subframes, and one direct frame number cycle (DFN cycle) includes 1024 direct frames. 10240 subframes of the 1024 direct frames are consecutively numbered from 0 to 10239, a first subframe is a subframe 0, and a 10240th subframe is a subframe 10239. Subframes following the subframe 10239 are subframes in a next cycle, and a first subframe in the direct frame number cycle is the subframe 0. As shown in FIG. 7, according to the formula mod(abs(k−0), 20)=0, obtained values of k may indicate subframes that are integer multiples of 20, for example, n−320, n−160, n, n+20, n+120, n+160, n+220, and n+320. Subframes whose subframe numbers k satisfy the equation mod(abs(k−0), 20)=0 are the second resource. FIG. 7 does not show all subframe numbers k that satisfy the equation mod(abs(k−0), 20)=0, such as n+40, n+60, n+80, and n+100 that are all integer multiples of the greatest common divisor 20. To be specific, all of these subframes satisfy the formula, and therefore these resources cannot be used for V2X communication or D2D communication. Optionally, the first step and the second step may be separately completed, or may be completed in one step.

The second resource shown in FIG. 7 includes the first resource and the third resource. The first resource includes n−320, n−160, n, n+160, n+320, and the like, and the first resource is a synchronization subframe and cannot be used for V2X communication or D2D communication. The third resource includes n+20, n+120, n+220, and the like. Although the third resource is not a synchronization subframe, the third resource becomes a synchronization subframe after at least one sending period of the first data. Therefore, if the terminal device selects the third resource to send the first data, the third resource may conflict with the synchronization subframe after the at least one sending period of the first data. If the third resource n+20 is selected to send the first data, because the sending period of the first data is 100 ms (100 subframes), the terminal device sends the first data in n+120, n+220, and n+320, the synchronization subframe also appears in the subframe n+320, and then, both the first data and the synchronization subframe are transmitted in the subframe n+320. Therefore, the third resource cannot be used for V2X communication or D2D communication, either.

Step 74: The terminal device selects a resource other than the second resource to send the first data. As shown in FIG. 7, the terminal device selects a resource other than n−320, n−160, n, n+20, n+120, n+160, n+220, and n+320 to send the first data.

In an optional embodiment, that the terminal device selects a resource other than the second resource to send the first data includes: the terminal device selects, from resources in a data sending resource selection window except the second resource, the resource for sending the first data. As shown in FIG. 7, if the data sending resource selection window ranges from n to n+320, the terminal device excludes n, n+20, n+120, n+160, n+220, and n+320, and selects another resource for sending the first data.

In an optional embodiment, a length of the data sending resource selection window is less than or equal to a first value Y, and the first value Y satisfies the following inequality: the sending period of the first data≤Y≤100 milliseconds. For example, if the sending period of the first data is 80 milliseconds, 80 ms≤Y≤100 ms; and if Y is 85 ms, the length of the data sending resource selection window is less than 85 ms.

According to this embodiment of this application, the first resource is a resource that cannot be used for transmitting the V2X communications data or the D2D communications data, and the terminal device determines the second resource based on the configuration information of the first resource and the sending period of the first data; and the second resource is also a resource that cannot be used for transmitting the V2X communications data or the D2D communications data, and the terminal device selects the resource other than the second resource to send the first data. Therefore, when selecting the resource used for the V2X communications data or the D2D communications data, the terminal device excludes the second resource that cannot be used for the V2X communications data or the D2D communications data, so as to avoid a conflict between the second resource and the resource selected by the terminal device for sending the first data, and improve reliability and security of D2D communication and V2X communication.

Figure 8:
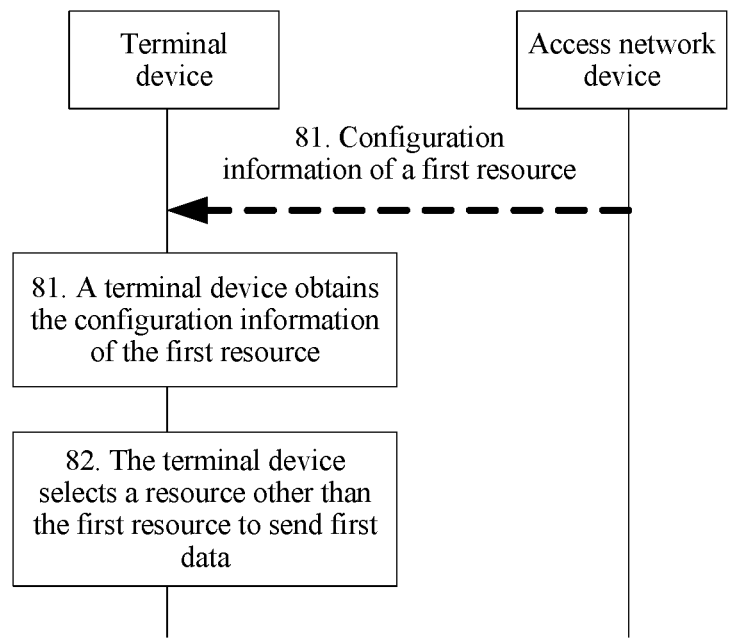
FIG. 8 shows a data sending method and system according to an embodiment of this application.

FIG. 8 shows a data sending method and system according to an embodiment of this application. Specific steps are as follows.

Step 81: A terminal device obtains configuration information of a first resource, where the first resource cannot be used for sending first data. Optionally, the first resource includes a downlink subframe or a special subframe, and the downlink subframe or the special subframe may be a downlink subframe or a special subframe in a time division duplex (TDD) system.

In an optional embodiment, that a terminal device obtains configuration information of a first resource includes: the terminal device receives the configuration information of the first resource from an access network device, and the access network device sends the configuration information of the first resource to the terminal device; or the terminal device obtains the configuration information of the first resource based on preconfigured information.

Step 82: The terminal device selects a resource other than the first resource to send the first data.

In an optional embodiment, that the terminal device selects a resource other than the second resource to send the first data includes: the terminal device selects, from resources in a data sending resource selection window except the second resource, the resource for sending the first data.

In an optional embodiment, a length of the data sending resource selection window is less than or equal to a first value Y, and the first value Y satisfies the following inequality: a sending period of the first data≤Y≤100 milliseconds.

According to this embodiment of this application, the first resource is a resource that cannot be used for transmitting V2X communications data or D2D communications data, and the terminal device selects the resource other than the first resource to send the first data. Therefore, when selecting the resource used for the V2X communications data or the D2D communications data, the terminal device excludes the first resource that cannot be used for V2X communications data or D2D communications data, so as to avoid a conflict between the first resource and the resource selected by the terminal device for sending the first data, and improve reliability and security of D2D communication and V2X communication.

Figure 9:
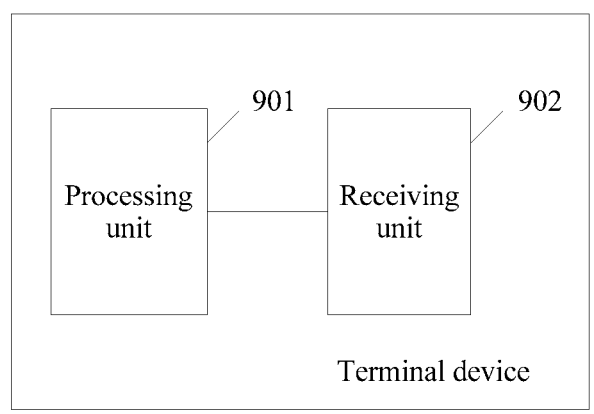
FIG. 9 shows a terminal device according to an embodiment of this application.

FIG. 9 is a possible schematic structural diagram of a terminal device configured to perform the method in the embodiment in FIG. 8. The terminal device includes a processing unit 901.

The processing unit 901 is configured to obtain configuration information of a first resource, where the first resource cannot be used for sending first data. Optionally, the first resource includes a downlink subframe or a special subframe, and the downlink subframe or the special subframe may be a downlink subframe or a special subframe in a time division duplex (TDD) system.

In an optional embodiment, that the processing unit 901 obtains configuration information of a first resource includes: the terminal device obtains the configuration information of the first resource based on preconfigured information. Optionally, the terminal device further includes a receiving unit 902. Obtaining the configuration information of the first resource by the processing unit 901 may be replaced with receiving the configuration information of the first resource by the receiving unit 902 from an access network device. In other words, the receiving unit 902 receives the configuration information of the first resource from the access network device, and the access network device sends the configuration information of the first resource to the receiving unit 902.

The processing unit 901 is further configured to select a resource other than the first resource to send the first data.

In an optional embodiment, that the processing unit 901 selects a resource other than the second resource to send the first data includes: the processing unit 901 selects, from resources in a data sending resource selection window except the second resource, the resource for sending the first data.

In an optional embodiment, a length of the data sending resource selection window is less than or equal to a first value Y, and the first value Y satisfies the following inequality: a sending period of the first data≤Y≤100 milliseconds.

According to this embodiment of this application, the first resource is a resource that cannot be used for transmitting V2X communications data or D2D communications data, and the terminal device selects the resource other than the first resource to send the first data. Therefore, when selecting the resource used for the V2X communications data or the D2D communications data, the terminal device excludes the first resource that cannot be used for V2X communications data or D2D communications data, so as to avoid a conflict between the first resource and the resource selected by the terminal device for sending the first data, and improve reliability and security of D2D communication and V2X communication.

Figure 10:
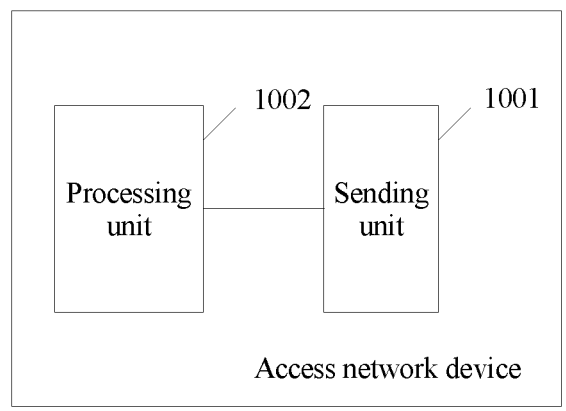
FIG. 10 shows an access network device according to an embodiment of this application.

FIG. 10 is a possible schematic structural diagram of an access network device configured to perform the method in the embodiment in FIG. 8. The access network device includes a sending unit 1001. Optionally, the access network device further includes a processing unit 1002.

The sending unit 1001 sends configuration information of a first resource to a terminal device, where the configuration information of the first resource is used by the terminal device to select a resource other than the first resource to send first data, where the first resource cannot be used for sending the first data. Optionally, the first resource includes a downlink subframe or a special subframe, and the downlink subframe or the special subframe may be a downlink subframe or a special subframe in a time division duplex (TDD) system.

In an optional embodiment, that the terminal device selects a resource other than the first resource to send first data includes: the terminal device selects, from resources in a data sending resource selection window except the first resource, the resource for sending the first data.

In an optional embodiment, a length of the data sending resource selection window is less than or equal to a first value Y, and the first value Y satisfies the following inequality: a sending period of the first data≤Y≤100 milliseconds.

According to this embodiment of this application, the first resource is a resource that cannot be used for transmitting V2X communications data or D2D communications data, and the terminal device selects the resource other than the first resource to send the first data. Therefore, when selecting the resource used for the V2X communications data or the D2D communications data, the terminal device excludes the first resource that cannot be used for V2X communications data or D2D communications data, so as to avoid a conflict between the first resource and the resource selected by the terminal device for sending the first data, and improve reliability and security of D2D communication and V2X communication.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separated, and parts displayed as units may or may not be physical units, may be located in one position, or may be distributed on a plurality of network units. Some or all of the units may be selected depending on an actual requirement to achieve the objectives of the solutions of the embodiments.

In addition, functional units in the embodiments of this application may be integrated into one processing unit, or each of the units may exist alone physically, or at least two units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A data sending method performed by a terminal device, the method comprising:
  obtaining a sending period of a first data;
  obtaining a configuration information of a first resource, wherein the first resource is not available for sending the first data;
  determining a second resource based on:
    the configuration information of the first resource, and
    the sending period of the first data; and
  selecting a resource other than the second resource to send the first data,
  wherein:
    the first resource comprises a synchronization subframe,
    the configuration information of the first resource comprises a period of the synchronization subframe and an offset,
    the determining a second resource based on the configuration information of the first resource and the sending period of the first data comprises determining the second resource based on:
      the period of the synchronization subframe,
      the offset, and
      the sending period of the first data;
    the determining the second resource based on the period of the synchronization subframe, the offset, and the sending period of the first data comprises:
      determining a greatest common divisor X of the period of the synchronization subframe and the sending period of the first data based on the period of the synchronization subframe and the sending period of the first data; and
      determining the second resource based on the offset and the greatest common divisor X,
    where a subframe number k of the second resource satisfies a formula:

$$\mathrm{mod}(\mathrm{abs}(k-\mathrm{offset}), X)=0, \text{ and}$$

where:
      k is an integer greater than or equal to 0,
      the offset is an offset of a first synchronization subframe in a system frame number cycle relative to a first subframe in the system frame number cycle, or the offset is an offset of a first synchronization subframe in a direct frame number cycle relative to a first subframe in the direct frame number cycle,
      X is a positive integer, abs(k−offset) represents an absolute value of k−offset, and mod(abs(k−offset), X) represents a remainder obtained by dividing abs(k−offset) by X.

2. The method according to claim 1, wherein the second resource comprises the first resource and a third resource, and the third resource is separated from the first resource by at least one sending period of the first data.

3. The method according to claim 1, wherein the obtaining, by the terminal device, configuration information of a first resource comprises:

receiving, by the terminal device, the configuration information of the first resource from an access network device; or obtaining, by the terminal device, the configuration information of the first resource based on preconfigured information.

4. A terminal device, comprising:

a processor, configured to obtain a sending period of first data, wherein the processor, is further configured to obtain configuration information of a first resource, wherein the first resource is not for sending the first data;

the processor, is further configured to determine a second resource based on the configuration information of the first resource and the sending period of the first data; and the processor, is further configured to select a resource other than the second resource to send the first data, wherein:

the first resource comprises a synchronization subframe, the configuration information of the first resource comprises a period of the synchronization subframe and an offset, the determining a second resource based on the configuration information of the first resource and the sending period of the first data comprises determining the second resource based on:

the period of the synchronization subframe, the offset, and the sending period of the first data;

the determining the second resource based on the period of the synchronization subframe, the offset, and the sending period of the first data comprises:

determining a greatest common divisor X of the period of the synchronization subframe and the sending period of the first data based on the period of the synchronization subframe and the sending period of the first data; and determining the second resource based on the offset and the greatest common divisor X, where a subframe number k of the second resource satisfies a formula:

mod(abs(k−offset),X)=0, and where:

k is an integer greater than or equal to 0, the offset is an offset of a first synchronization subframe in a system frame number cycle relative to a first subframe in the system frame number cycle, or the offset is an offset of a first synchronization subframe in a direct frame number cycle relative to a first subframe in the direct frame number cycle, X is a positive integer, abs(k−offset) represents an absolute value of k−offset, mod(abs(k−offset), X) represents a remainder obtained by dividing abs(k−offset) by X, and abs is the absolute value function.

5. The terminal device according to claim 4, wherein the second resource comprises the first resource and a third resource, and the third resource is separated from the first resource by at least one sending period of the first data.

6. The terminal device according to claim 4, wherein that the processor, is further configured to select a resource other than the second resource to send the first data comprises:

the processor, is configured to select, from resources in a data sending resource selection window except the second resource, the resource for sending the first data.

7. The terminal device according to claim 4, wherein that the processor, is configured to obtain configuration information of a first resource comprises:

the processor, is configured to obtain the configuration information of the first resource based on preconfigured information; or the terminal device further comprises a receiving unit, and the receiving unit receives the configuration information of the first resource from an access network device.

8. A data sending method, comprising:

sending, by an access network device, configuration information of a first resource to a terminal device, wherein the first resource is not for sending first data, the configuration information of the first resource is used by the terminal device to determine a second resource based on the configuration information of the first resource and a sending period of the first data, and the second resource is used by the terminal device to select a resource other than the second resource to send the first data, wherein:

the first resource comprises a synchronization subframe, the configuration information of the first resource comprises a period of the synchronization subframe and an offset, the determining a second resource based on the configuration information of the first resource and the sending period of the first data comprises determining the second resource based on:

the period of the synchronization subframe, the offset, and the sending period of the first data;

the determining the second resource based on the period of the synchronization subframe, the offset, and the sending period of the first data comprises:

determining a greatest common divisor X of the period of the synchronization subframe and the sending period of the first data based on the period of the synchronization subframe and the sending period of the first data; and determining the second resource based on the offset and the greatest common divisor X, where a subframe number k of the second resource satisfies a formula:

mod(abs(k−offset),X)=0, and where:

k is an integer greater than or equal to 0, the offset is an offset of a first synchronization subframe in a system frame number cycle relative to a first subframe in the system frame number cycle, or the offset is an offset of a first synchronization subframe in a direct frame number cycle relative to a first subframe in the direct frame number cycle, X is a positive integer, abs(k−offset) represents an absolute value of k−offset, mod(abs(k−offset), X) represents a remainder obtained by dividing abs(k−offset) by X, and abs is the absolute value function.

9. The method according to claim 8, wherein
the second resource comprises the first resource and a third resource, and the third resource is separated from the first resource by at least one sending period of the first data.

10. The method according to claim 8, wherein
the obtaining, by the terminal device, configuration information of a first resource comprises:
receiving, by the terminal device, the configuration information of the first resource from an access network device; or
obtaining, by the terminal device, the configuration information of the first resource based on preconfigured information.

11. An access network device, comprising:
a transmitter, configured to send configuration information of a first resource to a terminal device, wherein the first resource is not for sending first data, the configuration information of the first resource is for determining a second resource based on the configuration information of the first resource and a sending period of the first data, and the second resource is for the terminal device selecting a resource other than the second resource to send the first data,
wherein:
the first resource comprises a synchronization subframe,
the configuration information of the first resource comprises a period of the synchronization subframe and an offset,
the determining a second resource based on the configuration information of the first resource and the sending period of the first data comprises determining the second resource based on:
the period of the synchronization subframe,
the offset, and
the sending period of the first data;
the determining the second resource based on the period of the synchronization subframe, the offset, and the sending period of the first data comprises:
determining a greatest common divisor X of the period of the synchronization subframe and the sending period of the first data based on the period of the synchronization subframe and the sending period of the first data; and
determining the second resource based on the offset and the greatest common divisor X,
where a subframe number k of the second resource satisfies a formula:

$$\mathrm{mod}(\mathrm{abs}(k-\mathrm{offset}), X) = 0, \text{ and}$$

where:
k is an integer greater than or equal to 0,
the offset is an offset of a first synchronization subframe in a system frame number cycle relative to a first subframe in the system frame number cycle, or the offset is an offset of a first synchronization subframe in a direct frame number cycle relative to a first subframe in the direct frame number cycle, X is a positive integer, abs(k−offset) represents an absolute value of k−offset, mod(abs(k−offset), X) represents a remainder obtained by dividing abs(k−offset) by X, and abs is the absolute value function.

12. The access network device according to claim 11, wherein
the second resource comprises the first resource and a third resource, and the third resource is separated from the first resource by at least one sending period of the first data.

* * * * *